(12) United States Patent
Kato et al.

(10) Patent No.: US 7,090,566 B2
(45) Date of Patent: Aug. 15, 2006

(54) GRINDING APPARATUS AND METHOD FOR MANUFACTURING MAGNETIC RECORDING MEDIUM USING THE SAME

(75) Inventors: Shigemi Kato, Odawara (JP); Hideo Kawamura, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/851,326

(22) Filed: May 24, 2004

(65) Prior Publication Data
US 2004/0242130 A1 Dec. 2, 2004

(30) Foreign Application Priority Data
May 27, 2003 (JP) ............................. 2003-148757

(51) Int. Cl.
*B24B 1/00* (2006.01)

(52) U.S. Cl. ........................................ 451/59; 451/444

(58) Field of Classification Search ............... 451/54, 451/56, 57, 59, 443, 444; 29/603.14, 603.15, 29/603.16, 603.23, 603.27; 264/146, 147, 264/160
See application file for complete search history.

(56) References Cited

U.S. PATENT DOCUMENTS

| | | | |
|---|---|---|---|
| 4,608,037 A * | 8/1986 | Fleming, III | .................. 493/22 |
| 5,000,983 A | 3/1991 | Iida et al. | |
| 5,015,430 A * | 5/1991 | Suzuki et al. | ................ 264/146 |
| 6,811,472 B1 * | 11/2004 | Tran et al. | ..................... 451/54 |

FOREIGN PATENT DOCUMENTS

JP      62-172532 A      7/1987

* cited by examiner

*Primary Examiner*—Dung Van Nguyen
(74) *Attorney, Agent, or Firm*—Sughrue Mion, PLLC

(57) ABSTRACT

A grindstone of a diamond wheel is cleaned by a rotating brush additionally provided in close proximity of the diamond wheel during a grinding operation in which a magnetic layer of a magnetic tape material being transferred is ground continuously by the diamond wheel.

19 Claims, 6 Drawing Sheets

GRINDING APPARATUS AND METHOD FOR MANUFACTURING MAGNETIC RECORDING MEDIUM USING THE SAME

BACKGROUND OF THE INVENTION

1. Field of the Invention

The present invention relates to a grinding apparatus and a method for manufacturing a magnetic recording medium using the said apparatus. More particularly, it relates to a grinding apparatus suitable for manufacturing a low-noise and high-density magnetic recording medium and a method for manufacturing a magnetic recording medium using the said apparatus.

2. Description of the Related Art

Magnetic tapes made by applying a magnetic paint containing ferromagnetic powder and a binder have been used widely as magnetic recording media for audio and video systems, broadcasting, computer backup, and the like. In manufacturing such magnetic tapes, minute protrusions etc. on the surface of magnetic layer are sometimes removed by applying a grinding wheel such as a diamond wheel to the magnetic layer of magnetic tape (grinding) for prevention of wear of magnetic head, restraint of dropout, reduction in error rate, etc. (for example, Japanese Patent Application Publication No. 62-172532).

To manufacture such magnetic tapes, an apparatus is used which has a configuration such that a wide band-shaped magnetic tape material wound in a roll shape is cut into a plurality of narrow magnetic tapes with a slitter while being transferred, the magnetic tape is ground by a grinding wheel such as a diamond wheel, and subsequently the magnetic tape is wound up into a roll shape.

FIG. 6 is a schematic view in which the surfaces of magnetic layers of magnetic tapes 1, 1 . . . are ground by a grinding wheel 2. Conventionally, the grinding operation has been performed by windingly applying a plurality of (for example, forty) magnetic tapes 1, 1 . . . with a predetermined width (for example, 12.65 mm in width) to the cylindrical grinding wheel 2 having a predetermined length (for example, 1 m) as shown in FIG. 6.

However, such a grinding operation has a problem in that the grinding force of the grinding wheel 2 decreases gradually. The cause for this phenomenon of decreased grinding force is thought to be loading of grindstone caused by additives such as a binder component of magnetic layer, transferred objects of back layer, chips produced when the magnetic tape material is cut, shavings removed by grinding, and the like. If loading of grindstone occurs, the grinding force of grinding wheel for grinding the magnetic layer becomes nonuniform, and the quality of manufactured magnetic tape becomes unstable. In particular, in the case where the band-shaped magnetic tapes being transferred are ground continuously, a variation in the grinding force of grinding wheel causes a problem of the quality of magnetic tape that varies in the transfer direction of magnetic tape.

As a solution to this problem, conventionally, when loading of the grindstone of grinding wheel occurs, the grindstone surface is wiped off with a cloth etc. soaked with a solvent etc. capable of dissolving the magnetic paint to eliminate the loading of grindstone. This method has achieved a degree of effect.

SUMMARY OF THE INVENTION

However, in the above-described conventional method, the loading of grindstone occurs frequently, and on all such occasions, in order to restore the grinding force of grindstone, work is needed to wipe the grindstone surface with a cloth soaked with a solvent etc. by temporally stopping the production line for magnetic recording medium, which significantly deteriorates the productivity because of a burden on worker, an increase in downtime, and the like. Also, the loading of grindstone cannot often be eliminated by such work.

Also, as drastic measures against the loading of grindstone, the dressing of the grinding wheel is effective. However, when the dressing work is entrusted to the wheel manufacturer or the like, there arises a problem of long delivery time and high cost. Also, the productivity is deteriorated significantly by increased downtime and the like.

An object of the present invention is to provide a grinding apparatus capable of manufacturing a high-quality magnetic recording medium with low noise and high density stably with a high rate of operation by stabilizing the grinding force of a grinding wheel, and a method for manufacturing a magnetic recording medium using the grinding apparatus.

To achieve the above object, the present invention provides a grinding apparatus including a grinding wheel which continuously grinds the surface of a running web; and a cleaning device additionally provided in close proximity of the grinding wheel, which cleans a grindstone of the grinding wheel.

According to the grinding apparatus in accordance with the present invention, since the grindstone of the grinding wheel can be cleaned by the cleaning device during the grinding operation of the web, the loading of the grindstone can be eliminated effectively. Thereby, the grinding force of the grindstone of the grinding wheel can be stabilized, so that the variations in quality of the web in the web transfer direction can be prevented. Therefore, the grinding apparatus in accordance with the present invention is suitable as a grinding apparatus used in a method for manufacturing a magnetic recording medium, in which a transferred band-shaped magnetic recording medium must be ground continuously by the grinding wheel and the grinding effect in the transfer direction of the magnetic recording medium must be uniformed, like the grinding operation of a magnetic layer of the magnetic recording medium.

Also, in the grinding apparatus in accordance with the present invention, the cleaning device is preferably a rotating brush having a great effect of cleaning the grindstone of the grinding wheel. The reason for this is that the decrease in grinding force of the grindstone of the grinding wheel is caused by the adhesion of loaded substances to abrasive grains of the grindstone or the intrusion thereof into concave portions, and it can be anticipated that the brush of the rotating brush not only removes the loaded substances adhering to the abrasive grains but also scrapes off the loaded substances from the concave portions. In particular, the rotating brush is effective as a cleaning device which removes the loaded substances in the grinding wheel for grinding the magnetic recording medium.

Also, to achieve the above object, the present invention provides a method for manufacturing a magnetic recording medium, including the steps of applying a magnetic paint containing ferromagnetic powder and a binder onto a non-magnetic band-shaped flexible base material to be transferred to form a magnetic layer; and grinding the magnetic layer continuously with a grinding wheel on the downstream side of transfer, wherein a cleaning device which cleans a grindstone of the grinding wheel is additionally provided in close proximity of the grinding wheel to clean the grindstone during the grinding operation.

According to the method for manufacturing a magnetic recording medium in accordance with the present invention, the grindstone of the grinding wheel is cleaned by the cleaning device additionally provided on the grinding wheel during the grinding operation in which the magnetic layer of transferred magnetic recording medium is ground by the grinding wheel. Therefore, the loading of grindstone of the grinding wheel can be eliminated effectively. Thereby, the grinding force of the grinding wheel can be stabilized, so that a high-quality product of a low-noise and high-density coating type magnetic recording medium can be manufactured stably. Further, there is no need for stopping the manufacture of magnetic recording medium to clean the grindstone of the grinding wheel, so that the magnetic recording medium can be manufactured with a high rate of operation.

According to the present invention, it is preferable that the grindstone of the grinding wheel be always cleaned by the cleaning device during the time when the magnetic layer is ground by the grinding wheel. Thereby, the grinding force of the grinding wheel can be kept constant, being almost the same as the initial grinding force, so that a higher-quality magnetic recording medium having no variations in quality can be manufactured.

The present invention is not limited to the above-described configuration in which the grindstone is always cleaned during the grinding operation of the magnetic layer. The grindstone may be cleaned intermittently during the grinding operation of the magnetic layer. Further, the grindstone may be cleaned during the time when one roll (bulk) for manufacturing the magnetic recording medium is changed to the next roll. In this case as well, a degree of effect of restoring the grinding force of grindstone can be achieved.

In the present invention, the cleaning device is preferably a rotating brush for brushing the grindstone. The reason for this is the same as the reason explained regarding the grinding apparatus.

In the present invention, the brush material of the rotating brush is preferably one of chemical fiber, animal fiber, and vegetable fiber. A brush other than the above-described fibers, for example, a metal brush has a problem in that it easily damages the grindstone, and hence the abrasive grains rather come off from the grindstone. Among the chemical fiber, animal fiber, and vegetable fiber, the chemical fiber is excellent in wear resistance and heat resistance (resistance to heat generated by the rotation of rotating brush), and thus it is suitable as the brush of the rotating brush. As the chemical fiber, nylon, acrylic, Teflon, etc. are suitable. Also, a brush produced by mixing a filler such as aluminum oxide with the chemical fiber is especially preferred.

In the present invention, it is preferable that the rotational speed of the rotating brush be in the range of 100 to 1000 rpm, the brush bristle diameter of the rotating brush be in the range of 0.01 to 0.3 mm, and the brush bristle length of the rotating brush be in the range of 5 to 30 mm. Also, it is preferable that the brush of the rotating brush be pressed against the grindstone of the grinding wheel under a pressure such that the amount of pressing of the brush against the grindstone is in the range of 1 to 5 mm. If these conditions are met, an especially great cleaning effect can be achieved. Herein, the amount of pressing means a distance through which the rotating brush is brought close to the grinding wheel from a state in which the tip end of brush of the rotating brush is in contact with the grindstone surface of the grinding wheel in a straight form. By pressing the brush against the grindstone with the amount of pressing being provided, the brush comes into contact with the grindstone in a state in which the tip end portion thereof is defected.

Also, in the present invention, it is preferable that the rotating brush be covered with a suction hood having an opening on the grinding wheel side, and the suction pressure in the suction hood be 1 to 5 kPa. Thereby, the loaded substances having removed from the grinding wheel can be prevented from adhering to the magnetic recording medium.

As described above, according to the grinding apparatus and the method for manufacturing a magnetic recording medium using the apparatus in accordance with the present invention, loaded substances such as additives such as a binder component of magnetic layer causing loading of grinding wheel, transferred objects of back layer, chips produced when a magnetic tape material is cut, and the like can be removed effectively by the cleaning device in the grinding process. Thereby, the grinding force of the grinding wheel is stabilized, so that a high-quality product of a low-noise and high-density coating type magnetic recording medium can be manufactured stably with a high rate of operation.

DETAILED DESCRIPTION OF THE PREFERRED EMBODIMENTS

Preferred embodiments of a grinding apparatus in accordance with the present invention and a method for manufacturing a magnetic recording medium using the apparatus will now be described in detail.

Figure 1:
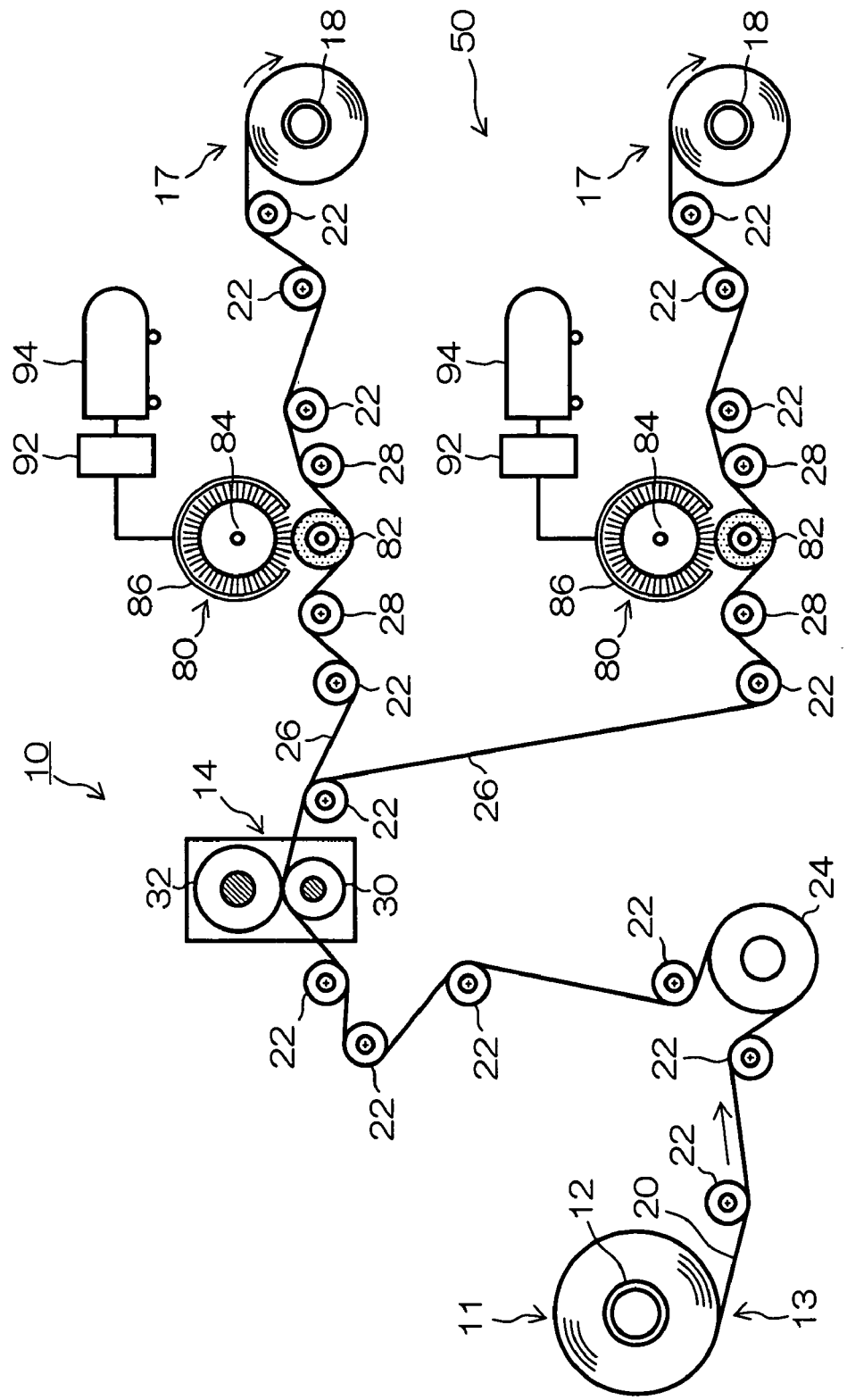
FIG. 1 is a schematic view of a magnetic tape manufacturing system which is used in the present invention.

FIG. 1 is a schematic view showing one example of a manufacturing system 10 for a magnetic tape (magnetic recording medium), to which the method for manufacturing a magnetic recording medium in accordance with the present invention is applied.

The magnetic tape manufacturing system 10 shown in FIG. 1 includes a tape supply device 13 which sends out a wide web-shaped magnetic tape material 20 wound in a roll shape, a slitter (cutting apparatus) 14 which cuts the wide magnetic tape material 20 into a plurality of narrow magnetic tapes 26, a grinding apparatus 80 with a cleaning device, which winds and grinds the magnetic tapes 26, and a tape winding-up device 50 which winds up the magnetic tapes 26 individually around a hub 18 (core) of a winding-up reel 17.

On a hub 12 (core) of a supply reel 11 in the tape supply device 13, the magnetic tape material 20 wound in a roll shape is mounted.

The magnetic tape material 20 is usually manufactured by forming a magnetic layer by applying a magnetic paint containing ferromagnetic particulates to a nonmagnetic flexible base material and by subjecting the magnetic layer to surface treatment such as orientation, drying, calendering (smoothening of magnetic layer), and hardening. To form the magnetic layer, besides the coating treatment, the vacuum deposition method or the like can be used.

As the nonmagnetic band-shaped flexible base material, generally, a flexible band-shaped object having a predetermined width, a length of 45 to 20,000 m, and a thickness of 2 to 200 μm, or a band-shaped object in which a fabrication layer is formed on the surface of the said flexible band-shaped object, which is used as a base material. The flexible band-shaped object is formed of a plastic film such as polyethylene terephthalate (PET), polyethylene-2,6-naphthalate, cellulose diacetate, cellulose triacetate, cellulose acetate propionate, polyvinyl chloride, polyvinylidene chloride, polycarbonate, polyimide, and polyamide, or paper to which α-polyolefins with the number of carbons of 2 to 10 such as polyethylene, polypropylene, and ethylene-butane copolymer is applied or laminated.

As the ferromagnetic powder used in the magnetic paint, various kinds of materials can be used. When the ferromagnetic powder is hexagonal ferrite, particulates with a plate diameter not larger than 35 nm and a plate ratio not lower than 2 can preferably be used, and when the ferromagnetic powder is ferromagnetic metallic powder, particulates with a major axis length not longer than 60 nm and an axis ratio not lower than 2 can preferably be used. As for the particle size of the ferromagnetic powder, particulates with an average primary particle volume not higher than 10,000 $nm^3$ can preferably be used.

As the solvent in which the ferromagnetic powder is soaked, a solution containing cyclohexanone is preferable. The content of cyclohexanone is preferably 30 to 100% by weight of the total quantity of solvent. As a solution other than cyclohexanone, methyl ethyl ketone, toluene, butyl acetate, or the like is preferably used.

As a method for applying the magnetic paint, the roller coating method, dip coating method, fountain coating method, etc. of application system, or the air knife coating method, blade coating method, bar coating method, etc. of metering system can be used. Also, as a method in which the application system and the metering system are used in the same portion, the extrusion coating method, slide bead coating method, curtain coating method, etc. can be used.

The thickness of the formed magnetic layer is preferably 0.02 to 3 μm, further preferably 0.02 to 0.2 μm, in dry film. Also, the layer construction is preferably such that a nonmagnetic layer consisting mainly of nonmagnetic powder and a binder is provided between the magnetic layer and the nonmagnetic base material. In particular, a construction having a thin magnetic layer has an advantage that the decrease in C/N in the shorter wavelength region is restrained not only to improve the performance of medium but also to enhance the productivity because coating stripes can be reduced by the crushing of agglomerated magnetic bodies.

The magnetic layer formed by applying the magnetic paint is dried after being subjected to treatment for orientating the ferromagnetic powder, namely, the magnetic field orientation treatment. The dried magnetic layer undergoes calendering treatment and hardening treatment, by which the magnetic tape material 20 is produced.

The magnetic tape material 20 thus produced is reeled out from the tape supply device 13, and is cut into a plurality of magnetic tapes 26 by the slitter 14 while being transferred. The cut magnetic tape 26 is wound up onto the tape winding-up device 50 after the magnetic layer is ground by the grinding apparatus 80. Although the grinding operation may be performed on the wide magnetic tape material 20, it is generally performed on the magnetic tape 26 having been cut to a predetermined product width (for example, 12.65 mm, 25.4 mm, 3.81 mm etc.)

Figure 2:
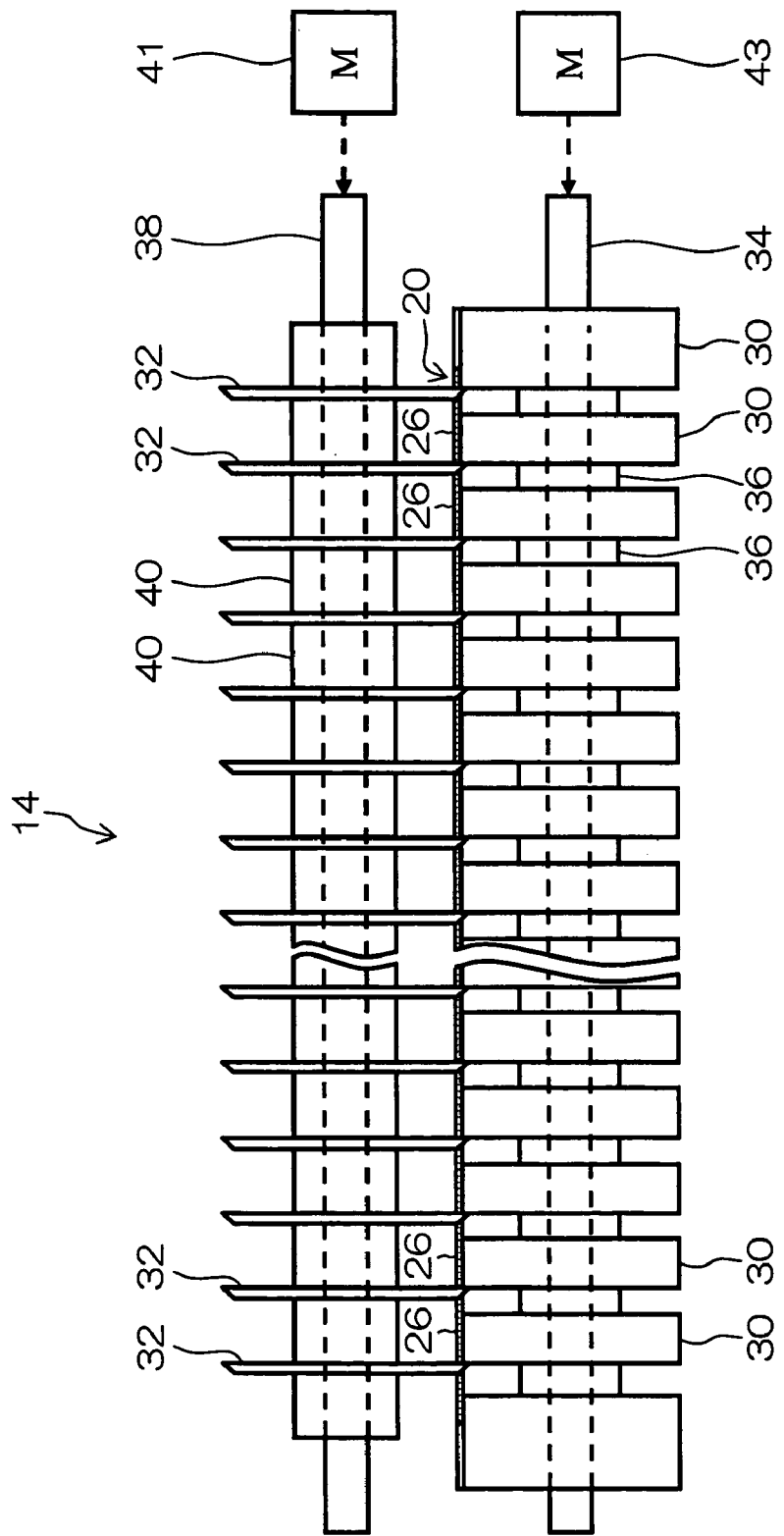
FIG. 2 is a side view of a slitter.

The slitter 14 is an apparatus for cutting the wide band-shaped magnetic tape material 20 into a plurality of magnetic tapes 26 by using a pair of upper and lower rotating blades 32 and 30. As shown in FIG. 2, the slitter 14 is made up of a plurality of lower rotating blades 30, 30 . . . each of which is formed into a roller shape as a backing blade and a plurality of upper rotating blades 32, 32 . . . of a thin disk shape, which cut the magnetic tape material 20 by giving a sheering force in combination with the lower rotating blade 30.

The lower rotating blades 30 are fittingly fixed to a lower shaft 34 via spacers 36, and the upper rotating blades 32 are fittingly fixed to an upper shaft 38 parallel with the lower shaft 34 via spacers 40. The upper rotating blade 32 and the lower rotating blade are arranged so that the blade edge portions thereof overlap with each other. The upper rotating blades 32 are urged to the right in the axial direction in FIG. 2 by a spring, not shown, so that the blade edge portions of the upper rotating blades 32 are positioned in a state of being in contact with the blade edge portions of the lower rotating blades 30. The upper and lower shafts 38 and 34 are connected to motors 41 and 43 capable of freely changing the rotational speed, respectively, so that the circumferential speeds of the upper and lower rotating blades 32 and 30 can be changed independently.

As shown in FIG. 1, between the supply reel 11 and the slitter 14, there are provided a plurality of guide rollers 22, 22 . . . for forming a transfer path for the magnetic tape material 20 and a suction drum 24 for regulating the transfer speed of the magnetic tape material 20. The suction drum 24 is connected to a motor (not shown) capable of freely changing the rotational speed, and is rotated in a state in which the magnetic tape material 20 is attracted to the peripheral surface of the suction drum 24, by which the transfer speed of the magnetic tape material 20 can be changed arbitrarily. The rotational speed of the hub 18 (core) of the winding-up reel 17 in the tape winding-up device 50 is controlled on the basis of the circumferential speed of the suction drum 24. The device which regulates the transfer speed of the magnetic tape material 20 is not limited to the suction drum 24, and a pinch roller for holdingly transferring the magnetic tape material 20 can also be used.

Between the slitter 14 and the tape winding-up device 50, there are provided a plurality of guide rollers 22, 22 . . . for forming a transfer path for the magnetic tape 26 and the grinding apparatus 80 with the cleaning device.

Figure 3:
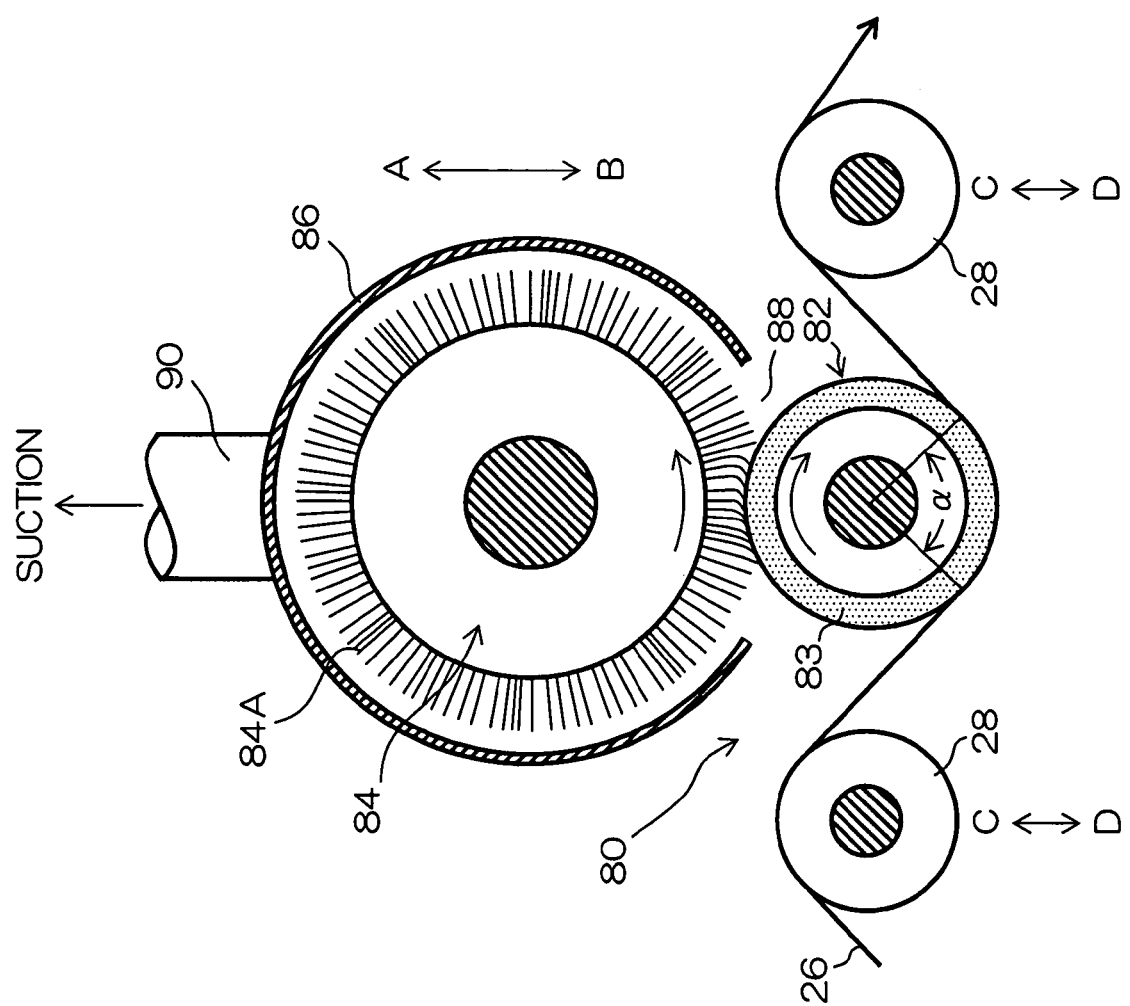
FIG. 3 is a schematic view of a grinding apparatus in accordance with the present invention.

As shown in FIG. 3, the grinding apparatus 80 with the cleaning device mainly includes the diamond wheel 82 (grinding wheel) which grinds the magnetic layer of the magnetic tape 26 which is arranged under tension between tension rollers 28, 28, a rotating brush 84 (cleaning device) which cleans a grindstone 83 of the diamond wheel 82, and a suction hood 86 surrounding the rotating brush 84.

As the diamond wheel 82, a diamond wheel of a metal bond type is preferably used. Depending on the conditions, a diamond wheel of a vitrified type, a diamond wheel of a resin bond type, or a diamond wheel of an electroformed type can also be used. The grain size of diamond abrasive grain used for the diamond wheel 82 is preferably #325 to #2000, further preferably #600 to #1200. If the grain diameter of diamond abrasive grain is too large, there undesirably arises a problem of flaws in magnetic layer. If the grain diameter of diamond abrasive grain is too small, the grinding capability undesirably decreases. Regarding the bond material property, concentration, etc. of the diamond wheel, an appropriate value may be selected according to the composition etc. of the magnetic layer. Also, regarding the winding angle and the relative speed in grinding, an appropriate value may be selected according to the outside diameter of the diamond wheel 82, the composition of magnetic layer, etc. Therefore, the tension rollers 28, 28 can be slid in the C-D direction in FIG. 3. The grinding operation is performed by windingly applying the magnetic tape 26 through a predetermined winding angle to the rotating cylindrical diamond wheel 82 so that the magnetic layer side is in contact with the diamond wheel 82 and by applying a predetermined tension to the diamond wheel 82. The winding angle a of the magnetic tape 26 around the diamond wheel 82 is preferably 60 to 150 degrees. In the example shown in FIG. 3, the direction of rotation of the diamond wheel 82 is the clockwise direction so that the wheel surface moves in the direction reverse to the running direction of the magnetic tape 26. By this configuration, the relative speed between the wheel surface and the surface of the magnetic tape 26 can be made high.

The rotating brush 84 is provided on the opposite side to the magnetic tape 26 in contact with the diamond wheel 82, and also is provided so as to be slidable in the A-B direction in FIG. 3 so that the rotating brush 84 can be brought into contact with the diamond wheel 82 at the time of cleaning. Thereby, the grindstone 83 of the diamond wheel 82 can be cleaned at desired time during the grinding process. As a mechanism for sliding the rotating brush 84, although not especially shown in the figure, a publicly known sliding mechanism can be used. For example, when the rotating brush 84 and the suction hood 86 are integrated, there can be used a sliding mechanism in which the suction hood 86 is slidably supported on a pillar rail via a nut member, and a ball screw threadedly engaged with the nut member is rotated by a motor via a speed reducer. Also, when the rotating brush 84 and the suction hood 86 are separated, a sliding mechanism that is the same as described above may be provided on the rotating brush 84.

The material of a brush 84A of the rotating brush 84 is preferably one of chemical fiber, animal fiber, and vegetable fiber. A brush other than the above-described fibers, for example, a metal brush has a problem in that it easily damages the grindstone 83, and hence the abrasive grains rather come off from the grindstone 83. Among the chemical fiber, animal fiber, and vegetable fiber, the chemical fiber is excellent in wear resistance and heat resistance (the contact between the brush of the rotating brush 84 and the grindstone 83 of the diamond wheel 82 produces heat), and thus it is suitable as the brush 84A of the rotating brush 84. As the chemical fiber, nylon, acrylic, Teflon, etc. are suitable. Also, a brush produced by mixing a filler such as aluminum oxide with the chemical fiber is especially preferred.

The rotational speed of the rotating brush 84 is preferably in the range of 100 to 1000 rpm. A cleaning force for removing loaded substances, which is loaded in the diamond wheel 82 by the grinding operation of the magnetic layer of the magnetic tape 26, by the rotating brush 84 achieves an especially great effect when the rotational speed of the rotating brush 84 is in the range of 100 to 1000 rpm. Also, the direction of rotation of the rotating brush 84 is preferably the direction reverse to the direction of rotation of the diamond wheel 82. The reverse rotation increases a brushing force of the rotating brush 84 with respect to the grindstone surface of the diamond wheel 82. The brush bristle diameter of the rotating brush 84 is preferably in the range of 0.01 to 0.3 mm. If the brush bristle diameter of the rotating brush 84 is too small, the stiffness is too low, so that a force for removing the loaded substances adhering to the abrasive grain of the grindstone 83 decreases, and also a force for scraping off the loaded substances intruding into concave portions in the grindstone 83 decreases. If the brush bristle diameter of the rotating brush 84 is too large, the brush bristle becomes difficult to enter the concave portions, so that the action of scraping off the loaded substances in the concave portions decreases. Therefore, it is preferable that the brush bristle diameter of the rotating brush 84 be further regulated in the range of 0.01 to 0.3 mm according to the grain size of abrasive grain used in the grindstone 83 of the diamond wheel 82. In the case of a grindstone in which the grain size of abrasive grain is #600 to #1200, the brush bristle diameter of the rotating brush 84 is preferably in the range of 0.01 to 0.1 mm. Also, the brush bristle length of the rotating brush 84 is preferably in the range of 5 to 30 mm. The range of 5 to 30 mm of the brush bristle length increases the cleaning force. It is preferable that the brush 84A be pressed against the grindstone 83 under a pressure such that the amount of pressing of the brush 84A of the rotating brush 84 against the grindstone 83 of the diamond wheel 82 is in the range of 1 to 5 mm. When the amount of pressing is in the above-described range, the cleaning force is especially high. The amount of pressing can also be adjusted by the aforementioned sliding mechanism.

The suction hood 86 surrounding the rotating brush 84 is formed into a cylindrical shape having a suction opening 88 on the diamond wheel 82 side, and the suction opening 88 is formed into a long rectangular shape in the axial direction of the rotating brush 84 (back and front direction of FIG. 3). The suction hood 86 is connected with a pressuretight flexible tube 90, and is connected to a vacuum pump 94 (refer to FIG. 1) via a trap device 92 (refer to FIG. 1). Thereby, when the vacuum pump 94 is operated, the interior of the suction hood 86 is evacuated, and thus air is sucked into the suction hood 86 through the suction opening 88, so that the loaded substances having removed from the grindstone 83 of the diamond wheel 82 by brushing with the rotating brush 84 pass in the suction hood 86 and is sucked and recovered by the trap device 92. In this case, since the suction hood 86 is in a cylindrical shape, the loaded substances sucked into the suction hood 86 are immediately exhausted through the flexible tube 90 without staying in the suction hood 86. Therefore, the loaded substances having removed from the grindstone 83 are prevented from adhering again to the magnetic tape 26. In this case, the suction pressure in the suction hood 86 is preferably 1 to 5 kPa. If the suction pressure is lower than 1 kPa, the loaded substances having been removed from the grindstone 83 cannot be sucked surely into the suction hood 86, and if the suction pressure exceeds 5 kPa, the suction pressure makes the transfer of the magnetic tape 26 unstable, which exerts an adverse influence on the grinding operation.

Next, the operation of the magnetic tape manufacturing system 10 that is configured as described above will be explained.

First, the roll-shaped magnetic tape material 20 that has been wound on the supply reel 11 of the magnetic tape manufacturing system 10 is pulled out of the supply reel 11 continuously, and is transferred to the slitter 14. The transferred magnetic tape material 20 is cut into a plurality of magnetic tapes 26 by the slitter 14, and each of the magnetic tapes 26 is transferred to the grinding apparatus 80.

In the grinding apparatus 80, the magnetic layer of the magnetic tape 26 is ground by the diamond wheel 82, and at the same time, the grindstone 83 of the diamond wheel 82 is cleaned by the rotating brush 84 during the grinding operation. Thereby, since the grindstone 83 of the diamond wheel 82 can be cleaned during the grinding operation of the magnetic tape 26, the loading of the grindstone 83 can be eliminated effectively. Therefore, the grinding force of the diamond wheel 82 can be stabilized, so that the variations in quality of the magnetic tape 26 in the transfer direction of the magnetic tape 26 can be eliminated. It is preferable that in this cleaning operation, the grindstone 83 of the diamond wheel 82 be always cleaned by the rotating brush 84 during the grinding operation in which the magnetic layer of the magnetic tape 26 is ground by the diamond wheel 82. Thereby, the grinding force of the diamond wheel 82 can be kept substantially constantly in a state of the grinding force of a new diamond wheel 82 for a long period of time. Therefore, a higher-quality magnetic tape 26 having no variations in quality can be manufactured.

Next, the magnetic tape 26 having been ground in the grinding process is wound up onto the hub 18 of the winding-up reel 17. Thereby, for example, the magnetic tape material 20 is cut into 40 to 250 magnetic tapes, and the magnetic tape 26 having a specified width (for example, 12.65 mm, 25.4 mm, 3.81 mm, etc.) is manufactured.

The above is a description of an embodiment of the method for manufacturing a magnetic recording medium in accordance with the present invention. The present invention is not limited to the above-described embodiment, and various modes of invention can be applied.

For example, the grindstone 83 of the diamond wheel 82 can be cleaned intermittently with the rotating brush 84 during the grinding operation of the magnetic tape 26. Further, cleaning can be performed in a time zone when the magnetic tape material 20 mounted on the tape supply device 13 is exchanged.

EXAMPLES

Next, working examples of the present invention will be explained by comparison with a comparative example. As the working example of the present invention, the magnetic tape manufacturing system 10 shown in FIG. 1 was used. As the comparative example, a manufacturing system in which the rotating brush 84 and the suction hood 86 are removed from the grinding apparatus 80 of the magnetic tape manufacturing system 10 shown in FIG. 1 was used. The fabrication conditions were the same for the working example and the comparative example, with the exception of the cleaning treatment.

The magnetic tape 26 was fabricated by being cut to a width of 3.8 mm by the slitter 14 so as to conform to the DDS4 Standard. The running speed of the magnetic tape 26 was set at 200 m/min. The tension of the magnetic tape 26 was controlled so as to be 100 g in the 3.8 mm width. The total thickness of the magnetic tape 26 was 5.6 μm.

The diamond wheel 82 used in grinding operation had a columnar shape, and the outside diameter thereof was 70 mm and the grain size of abrasive grain was #800. The conditions in grinding operation were controlled so that the circumferential speed was 200 m/min. As a result, the relative speed between the diamond wheel 82 and the magnetic tape 26 became 400 m/min. The winding angle α of the magnetic tape 26 around the diamond wheel 82 was set at 90 degrees.

As the rotating brush 84 used for cleaning, a rotating brush having the brush 84A whose material was nylon, whose brush bristle diameter was 0.1 mm, and whose brush bristle length was 10 mm was used. The rotating brush 84 was rotated at a rotational speed of 200 rpm, and was set so that the amount of brush pressing was 3 mm. Also, the suction pressure in the suction hood 86 was set at 3 kPa.

Figure 4:
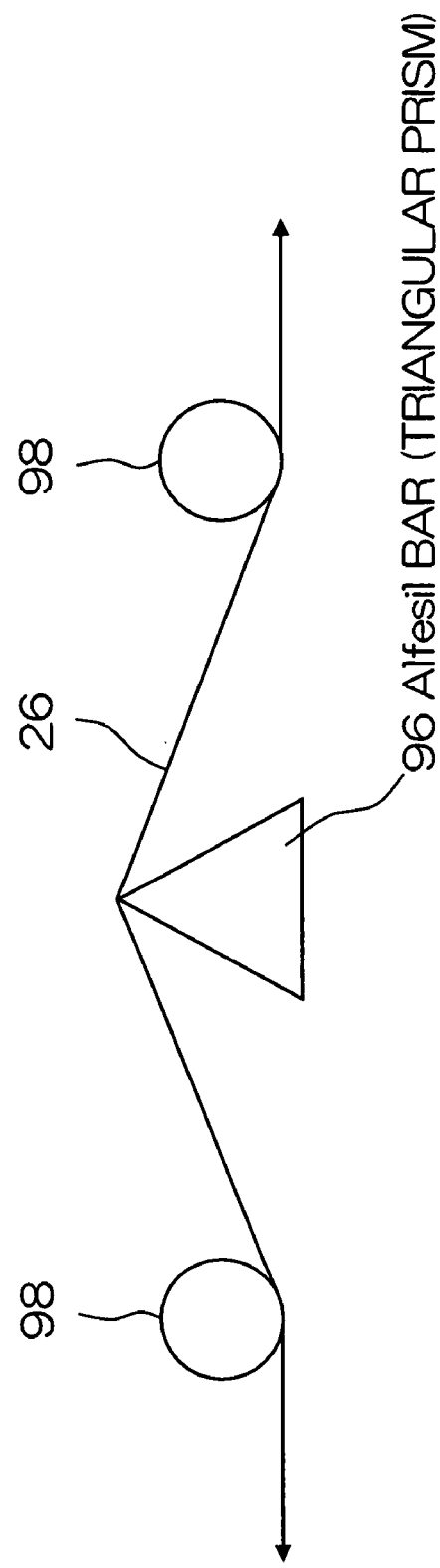
FIG. 4 is a conceptual view showing a configuration of an abrasion test.

As a method for confirming the effects of the working example and comparative example, an abrasion test was conducted using the magnetic tape 26 thus manufactured. The configuration of the abrasion test is shown in FIG. 4. In this abrasion test, the magnetic tape 26 set under tension between guide rollers 98, 98 was reciprocatingly run so as to be pressed against an Alfesil bar 96, and the abrasion wear (μm) at the tip end of the Alfesil bar 96 was measured. The abrasion wear for satisfying the requirements of DDS4 Standard is 12 μm or smaller.

The Alfesil bar 96 is a bar made of an alloy of Al (aluminum), Fe (iron) and Si (silicon), and has a triangular prism shape. The running speed of the magnetic tape 26 was set at 300 mm/sec (18 m/min), the tension of the magnetic tape 26 was set at 20 g (in the 3.8 mm width), and the winding angle of the magnetic tape 26 around the Alfesil bar 96 was set at 24 degrees. For the magnetic tape 26, a magnetic tape roll with a length of 50 m was used.

Figure 5A:
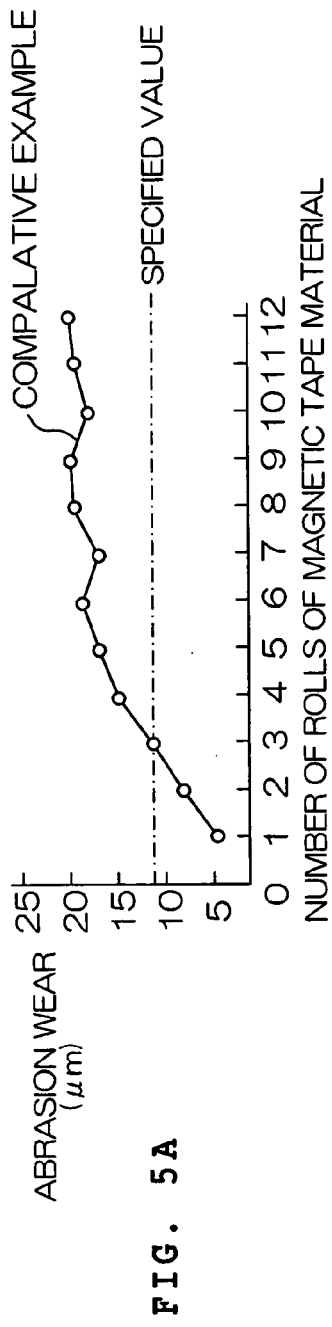
FIGS. 5A to 5C are graphs showing the results of abrasion test.
Figure 5B:
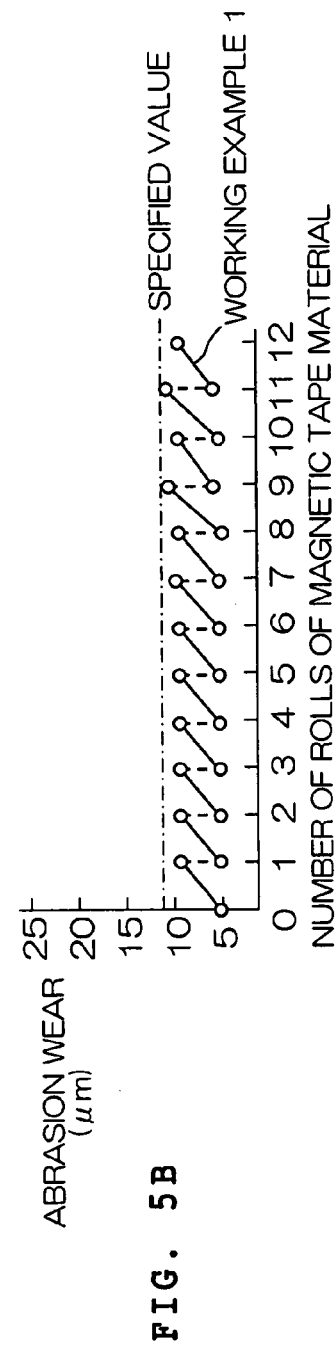
Figure 5C:
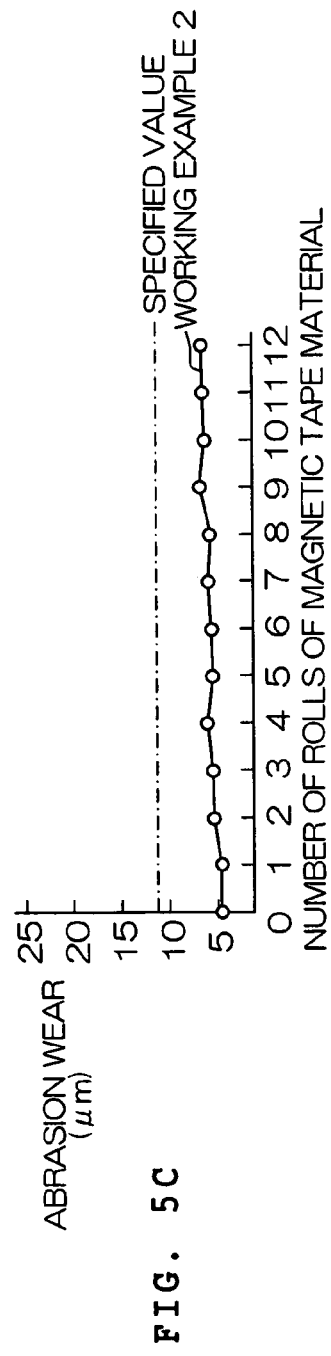
Figure 6:
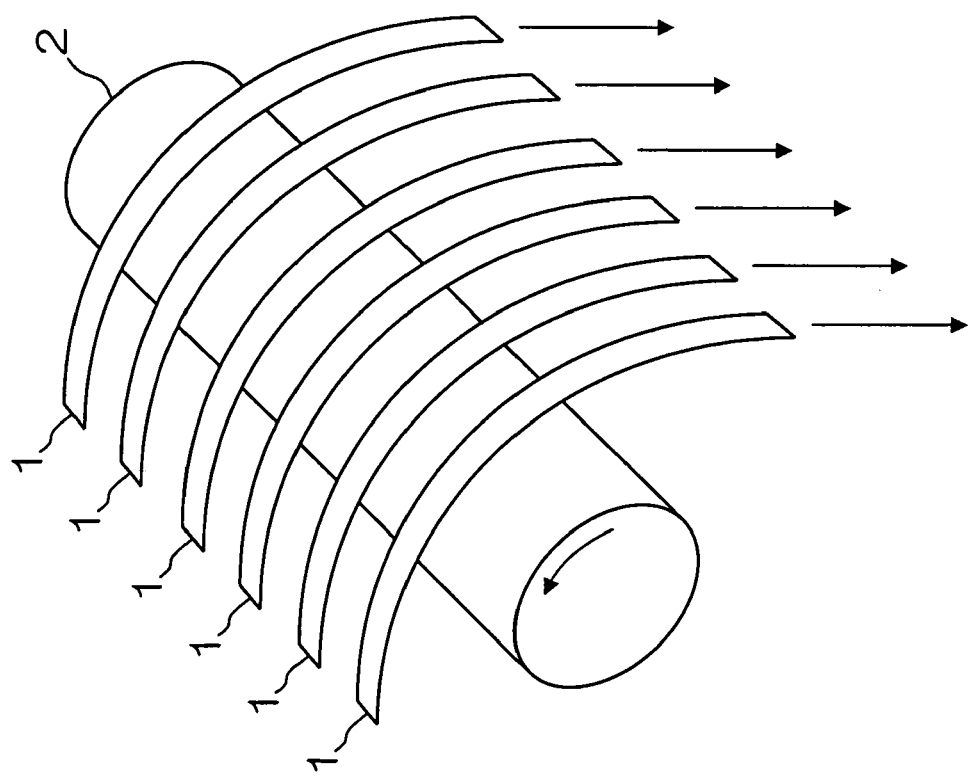
FIG. 6 is a conceptual view showing a state in which a grinding operation is performed using a conventional diamond wheel.

The test results are shown in FIGS. 5A to 5C.

FIG. 5A shows the comparative example in which the rotating brush 84 and the suction hood 86 were not provided. FIG. 5B shows working example 1, in which the grindstone 83 of the diamond wheel 82 was cleaned with the rotating brush 84 in a time zone when the magnetic tape material 20 mounted on the tape supply device 13 was exchanged. FIG. 5C shows working example 2, in which the grindstone 83 of the diamond wheel 82 was always cleaned with the rotating brush 84 during the grinding operation in which the magnetic layer of the magnetic tape 26 is ground by the diamond wheel 82.

As the result, in the comparative example shown in FIG. 5A, the abrasion wear of the Alfesil bar 96 increased in proportion to the number of treated rolls of the magnetic tape material 20, and when the number of treated rolls reached three, the abrasion wear was 12 μm. When the number of treated rolls reached four, the abrasion wear was 15 μm, deviating from the standard value.

Contrarily, in working example 1 shown in FIG. 5B, by grinding one roll of the magnetic tape material 20, the abrasion wear of the Alfesil bar 96 caused by the magnetic tape 26 was increased from about 4 μm at the grinding operation start time to about 8 μm at the grinding operation finish time. However, by cleaning the grindstone 83 of the diamond wheel 82 with the rotating brush 84 in a time zone when the magnetic tape material 20 was exchanged, the abrasion wear of the Alfesil bar 96 was decreased to about 4 μm.

In working example 2 shown in FIG. 5C, even if the number of treated rolls of the magnetic tape material 20 reached ten, the abrasion wear of the Alfesil bar 96 could scarcely be detected, and the grinding force of the diamond wheel 82 was kept substantially constant, being almost the same as the initial grinding force. Thus, it can be seen that for the tape 26 manufactured by performing the cleaning operation of working example 2 of the present invention, the abrasion of the Alfesil bar 96 scarcely occurs, and hence the grinding treatment of the magnetic tape 26 is stable for a long period of time. In other words, it can be seen that the loading of the diamond wheel 82 decreases significantly, and hence the grinding capability of the diamond wheel 82 is stable for a long period of time. By the above-described abrasion test, the remarkable effects of the embodiment of the present invention could be confirmed.

What is claimed is:

1. A grinding apparatus comprising:
a grinding wheel which continuously grinds the surface of a transferred web; and
a cleaning device additionally provided in close proximity of said grinding wheel, which cleans a grindstone of said grinding wheel,
wherein the grinding wheel is a diamond wheel and
the diamond wheel is one of a vitrified type, resin bond type, an electroformed type, and a metal bond type.

2. The grinding apparatus according to claim 1, wherein said web is a magnetic recording medium.

3. The grinding apparatus according to claim 2, wherein said cleaning device is a rotating brush.

4. The grinding apparatus according to claim 1, wherein said cleaning device is a rotating brush.

5. The grinding apparatus according to claim 1, wherein the cleaning device comprises bristles having a bristle diameter in a range of 0.01 to 0.3 mm.

6. The grinding apparatus according to claim 5, wherein the bristle diameter is set according to a size of abrasive grain used in the grindstone.

7. The grinding apparatus according to claim 1, wherein the cleaning device comprises bristles having a bristle length in a range of 5 to 30 mm.

8. The grinding apparatus according to claim 1, wherein the cleaning device comprises bristles and the cleaning device is pressed against the grindstone under a pressure such that an amount of bristles pressed against the grindstone is in a range of 1 to 5 mm.

9. The grinding apparatus according to claim 1, wherein the grinding wheel is rotated so that a surface of the grinding wheel moves in a direction reverse to a running direction of the transferred web.

10. A grinding apparatus comprising:
a grinding wheel which continuously grinds the surface of a transferred web; and
a cleaning device additionally provided in close proximity of said grinding wheel, which cleans a grindstone of said grinding wheel,
wherein the grinding wheel is a diamond wheel and
the diamond wheel comprises a grain size of greater than #500 and equal to or less than #2000.

11. The grinding apparatus according to claim 10, wherein said web is a magnetic recording medium.

12. The grinding apparatus according to claim 10, wherein said cleaning device is a rotating brush.

13. The grinding apparatus according to claim 10, wherein the cleaning device comprises bristles having a bristle diameter in a range of 0.01 to 0.3 mm.

14. The grinding apparatus according to claim 10, wherein the cleaning device comprises bristles having a bristle length in a range of 5 to 30 mm.

15. The grinding apparatus according to claim 10, wherein the cleaning device comprises bristles and the cleaning device is pressed against the grindstone under a pressure such that an amount of bristles pressed against the grindstone is in a range of 1 to 5 mm.

16. The grinding apparatus according to claim 10, wherein the grinding wheel is rotated so that a surface of the grinding wheel moves in a direction reverse to a running direction of the transferred web.

17. A grinding apparatus comprising:
a grinding wheel which continuously grinds the surface of a transferred web; and
a cleaning device additionally provided in close proximity of said grinding wheel, which cleans a grindstone of said grinding wheel,
wherein the grinding wheel is a diamond wheel and the diamond wheel comprises a grain size between #800 to #1200.

18. A magnetic medium grinding apparatus for grinding magnetic medium, said magnetic medium grinding apparatus comprising:
a grinding wheel which continuously grinds a surface of said magnetic medium; and
a cleaning device additionally provided in close proximity of said grinding wheel, which cleans a grindstone of said grinding wheels,
wherein the grinding wheel is a diamond wheel,
the diamond wheel is one of a vitrified type, resin bond type, an electroformed type and a metal bond type, and
the diamond wheel comprises a grain size of greater than #500 and equal to or less than #2000.

19. A grinding apparatus in combination with a magnetic tape for grinding a surface of said magnetic tape, said grinding apparatus comprising:
a grinding wheel for continuously grinding the surface of said magnetic tape; and
a cleaning device additionally provided in close proximity of said grinding wheel, which cleans a grindstone of said grinding wheels,
wherein the grinding wheel is a diamond wheel,
the diamond wheel is one of a vitrified type, resin bond type an electroformed type and a metal bond type, and
the diamond wheel comprises a grain size of greater than #500 and equal to or less than #2000.

* * * * *